United States Patent Office.

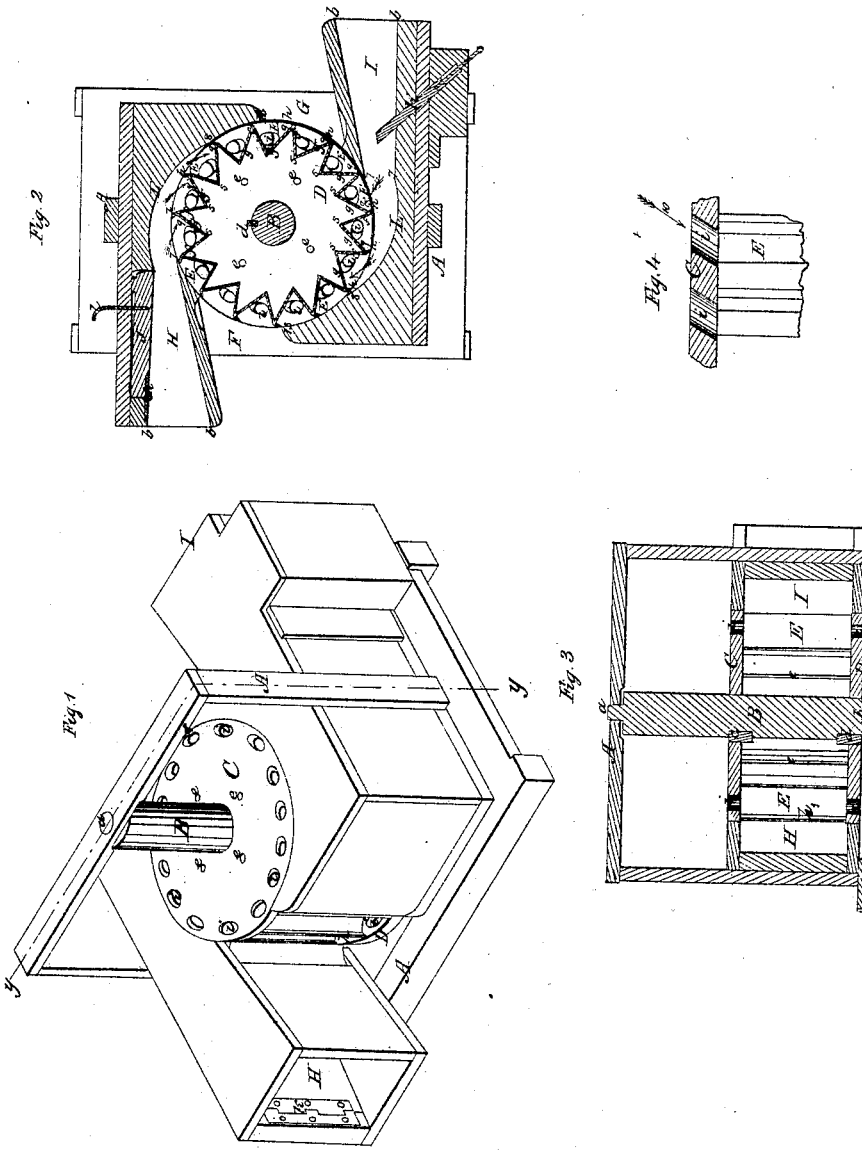

LUKE W. BLOOD AND ROBERT A. BLOOD, OF SPRINGFIELD, NEW HAMPSHIRE.

Letters Patent No. 69,169, dated September 24, 1867.

IMPROVEMENT IN WATER-WHEELS.

*The Schedule referred to in these Letters Patent and making part of the same.*

TO ALL WHOM IT MAY CONCERN:

Be it known that we, LUKE W. BLOOD and ROBERT A. BLOOD, both of Springfield, in the county of Sullivan, and State of New Hampshire, have invented certain Improvements in Water-Wheels, of which the following is a full, clear, and exact description, reference being had to the accompanying drawings, making part of this specification, in which—

Figure 1 is a perspective view of improved water-wheel.

Figure 2 is a horizontal section through the same.

Figure 3 is a vertical section on the line $y\ y$, fig. 1; and

Figure 4 a detail to be referred to.

Our invention consists in so forming the buckets of a water-wheel, and so arranging them within it and with respect to the stream, that the greatest possible amount of its power is utilized, a swinging water-gauge being employed in connection therewith, by which means more or less water may be used, according as it is desired to increase or reduce the power of the wheel, the said buckets being provided with inclined vent-holes to allow of the escape of the air therefrom.

To enable others skilled in the art to understand and use our invention, we will proceed to describe the manner in which we carry it out.

In the said drawings, A is the framework, in suitable bearings $a\ b$, in which runs a vertical shaft, B, to which is secured, by splines $c\ d$, the ends or heads C D, forming the top and bottom of a circular horizontal water-wheel, the two heads being properly braced and secured together by bolts $e$. E are wooden or metal buckets or boxes, of a star-pointed form, as seen in fig. 2, which extend vertically between the heads, to which they are properly secured by grooves or otherwise, the two sides $f\ g$ of each bucket being fitted snugly together to make a water-tight joint at 5, and the interior of the wheel, between the shaft and the boxes, being made hollow for lightness and economy. The outer end of the side $g$ of each bucket is bent around to form a shoulder, or has attached to it a short piece, $h$, which opens outward to allow the water, after striking the bucket, to escape freely therefrom into the eduction-passages F G, on each side of the wheel. Through the heads of the wheel, at the top and bottom of each space, enclosed by the sides $f\ g$ of a bucket, and near the vertex of the angle formed by their intersections, is cut an inclined vent-hole, $i$, for the escape of the air contained in the water. H I are induction-passages, of the form seen in fig. 2, being contracted in area from 6 to 7, as the water approaches the wheel. J K are gates or water-gauges, which command the induction-passages and regulate the supply of water to the wheel. The gauge J is hinged or pivoted at $k$ to the side of the flume, and swings freely thereon, opening and closing the induction-passage and increasing or reducing the size of the stream, as required. $l$ is an arm or rod by which the gauge J is operated. From the point 7 to the point 8 the stream follows the curved side L of the passage, and is directed at the same moment upon three buckets, fig. 2, the width of the stream, and consequently its volume, decreasing from the first to the third bucket, and striking the side $g$ of each at about the point 9, when, having imparted its inertia thereto, it is deflected or turned by the open form of the bucket, together with the centrifugal force of the wheel, outward into the eduction-passage. The vent-holes are inclined in the direction of the arrow 10, (see fig. 4,) which is contrary to the direction 11 taken by the water in striking the buckets, the degree of the inclination of the holes, in connection with their position, (inside the point 9, where the water strikes the buckets,) serving to prevent in a great measure the passage of the water through them. Should, however, a small portion of the water escape in this way, still its power will be utilized, owing to its reaction after striking the buckets. The form and diameter of the wheel-pit, from 8 to 13, exactly coincides with the outer periphery of the heads C D, in order that the full force of the water may be imparted to the buckets, after which it is free to pass out of the eduction-passage, the form of which, contiguous to the wheel, is curved, as seen in fig. 2, to facilitate the discharge of the water and prevent any loss of power which would arise if the wheel were obstructed by it.

We do not confine ourselves to the exact form and position of the vent-holes, as they may be somewhat varied without departing from the spirit of our invention. Instead of the shaft B being placed in a vertical position, it may be horizontal, a suitable induction-passage being formed to suit the requirements of the case.

Claim.

What we claim as our invention, and desire to secure by Letters Patent as an improvement in water-wheels, is—

The star-pointed bucket E, formed by the intersection of the sides $f\,g$, as shown and described, in combination with the air or vent-holes $i$, the whole constructed substantially as set forth.

We also claim, in combination with the above, the pieces $h$, substantially as and for the purpose set forth.

LUKE W. BLOOD,
ROBERT A. BLOOD.

Witnesses:
   WM. RUSSELL,
   JOHN S. WHIPPLE.